US012123429B2

(12) United States Patent
Kosmicki et al.

(10) Patent No.: US 12,123,429 B2
(45) Date of Patent: Oct. 22, 2024

(54) ALIGNMENT PORTIONS ON MAIN LINER FOR A PUMP

(71) Applicant: Weir Slurry Group, Inc., Madison, WI (US)

(72) Inventors: Randy James Kosmicki, Edgerton, WI (US); Ronald Joseph Bourgeois, Sun Prairie, WI (US)

(73) Assignee: WEIR SLURRY GROUP, INC., Madison, WI (US)

( * ) Notice: Subject to any disclaimer, the term of this patent is extended or adjusted under 35 U.S.C. 154(b) by 0 days.

(21) Appl. No.: 17/926,824

(22) PCT Filed: May 28, 2021

(86) PCT No.: PCT/AU2021/050521
§ 371 (c)(1),
(2) Date: Nov. 21, 2022

(87) PCT Pub. No.: WO2021/237304
PCT Pub. Date: Dec. 2, 2021

(65) Prior Publication Data

US 2023/0228282 A1 Jul. 20, 2023

Related U.S. Application Data

(60) Provisional application No. 63/032,104, filed on May 29, 2020.

(30) Foreign Application Priority Data

Jun. 29, 2020 (AU) ................................ 2020902178

(51) Int. Cl.
*F04D 29/42* (2006.01)
*F04D 7/04* (2006.01)

(52) U.S. Cl.
CPC ........... *F04D 29/4286* (2013.01); *F04D 7/04* (2013.01); *F05D 2260/36* (2013.01)

(58) Field of Classification Search
CPC ..... F04D 29/4286; F04D 7/04; F05D 2260/36
See application file for complete search history.

(56) References Cited

U.S. PATENT DOCUMENTS

| | | | |
|---|---|---|---|
| 1,591,939 | A | 7/1926 | Humphrey |
| 1,967,182 | A | 7/1934 | Allen |
| 2,110,079 | A | 3/1938 | Butler |

(Continued)

*Primary Examiner* — Grant Moubry
*Assistant Examiner* — Ruben Picon-Feliciano
(74) *Attorney, Agent, or Firm* — Morriss O'Bryant; Compagni Cannon, PLLC.

(57) ABSTRACT

Disclosed is a main liner for a centrifugal pump having a main pumping chamber, the main liner being located within an outer housing of the centrifugal pump, when in use, and comprising: a main pumping chamber; an inlet opening for the introduction of a liquid into the main pumping chamber; a discharge outlet extending from the main pumping chamber; and an outer surface of the discharge outlet for contact with the outer housing for the liner, the outer surface having at least one alignment portion for engaging with a corresponding alignment portion on the outer housing, the engagement of the alignment portion with the corresponding alignment portion limiting movement of the discharge outlet relative to the outer housing.

6 Claims, 19 Drawing Sheets

(56) References Cited

U.S. PATENT DOCUMENTS

| | | | | |
|---|---|---|---|---|
| 2007/0014662 | A1 | 1/2007 | Burgess | |
| 2015/0240837 | A1 * | 8/2015 | Glaves | B66C 1/44 415/196 |

* cited by examiner

ALIGNMENT PORTIONS ON MAIN LINER FOR A PUMP

TECHNICAL FIELD

The present invention generally relates to minerals processing equipment and more particularly to replaceable wear parts for minerals processing equipment.

BACKGROUND

Many parts of mining equipment suffer abrasion due to the movement of slurry through or over the equipment. The slurry may vary in concentration of solid particles, size of the solid particles, shape of solid particles, and composition of a solution suspending the particles. The parts, exposed to high rates of wear, may be designed for replacement to improve operational lifespans of the mining equipment. Once the part is sufficiently worn, the part is replaced.

The parts may be used in different types of mining equipment, such as a slurry pump which is a type of pump designed for pumping liquid containing solid particles. Variations in design and construction of the pump may occur to account for the various different types of slurry. An example of a slurry pump is a centrifugal pump.

Due to the abrasive nature of the medium being pumped, such pumps experience a very high wear rate on their internal parts, such as the main liner that houses the impeller and the side liners located on either side of the main liner. The side liners include a front sider liner that is located on the inlet side of the impeller and a rear side liner that is located on the opposing side of the impeller. In particular, the side liner located on the inlet side of the pump (which is also referred to as a front side liner or a throatbush) and the main liner (which is also referred to as a volute liner) are both subjected to a great deal of wear.

As a result of the wear, many of the internal parts are replaceable wear parts. Typically the main liner and the side liners of a slurry pump may be replaceable. Such wear parts may be made of an elastomer, such as natural rubber, polyurethane or neoprene, or made of wear resistant cast alloys. Due to cost, alloy wear parts are typically used for situations where an elastomer wear part is not suitable, such as when the slurry contains particles with coarse or sharp edges or for high operating temperatures or velocities.

Elastomer wear parts are used where possible, although there is variation of wear resistance between different types of elastomers. For example, natural rubber exhibits better wear resistance than synthetic elastomers such as neoprene or butyl. However, synthetic elastomers may have other desirable properties such as greater chemical resistance than natural rubber.

The wear parts may be attached to a non-wearing part or located within a housing. In the case of an elastomer main liner, the liner is located within an outer housing, also known as a casing. Positioning of the main liner within the outer housing is important during installation and operation of a pump to ensure correct operation of the main liner.

The preferred embodiments of the present invention seek to address one or more of these disadvantages, and/or to at least provide the public with a useful alternative.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

This Summary is provided to introduce a selection of concepts in a simplified form that are further described below in the Detailed Description. This Summary is not intended to identify essential features of the claimed subject matter, nor is it intended to be used to limit the scope of the claimed subject matter.

In a one embodiment, there is provided by way of example only a main liner for a centrifugal pump having a main pumping chamber, the main liner being located within an outer housing of the centrifugal pump, when in use, and comprising: a main pumping chamber; an inlet opening for the introduction of a liquid into the main pumping chamber; a discharge outlet extending from the main pumping chamber; and an outer surface of the discharge outlet for contact with the outer housing for the liner, the outer surface having at least one alignment portion for engaging with a corresponding alignment portion on the outer housing, the engagement of the alignment portion with the corresponding alignment portion limiting movement of the discharge outlet relative to the outer housing.

In one embodiment the alignment portion limits movement of the discharge outlet in a direction towards the main pumping chamber of the liner.

In one embodiment the alignment portion limits movement of the main liner in a direction opposite to a flow direction of the liquid as the liquid exits the discharge outlet when in use.

In one embodiment the alignment portion limits movement of the discharge outlet in a direction away from the main pumping chamber of the liner.

In one embodiment the alignment portion limits movement of the liner in either direction axially of the discharge outlet.

In one embodiment the fluid is a slurry.

In one embodiment the alignment portion is formed from a plurality of discontinuous segments.

In one embodiment the alignment portion limits movement of the discharge outlet to maintain sealing of the discharge outlet.

In one embodiment the liner is formed from a first and second part and the alignment portion of the discharge outlet enables alignment of the first and second part within the outer housing.

In one embodiment the alignment portion is located at an end of the discharge outlet.

In one embodiment, there is provided by way of example only a main liner for a centrifugal pump, the liner being located within an outer housing of the centrifugal pump, when in use, and comprising: a main pumping chamber; an inlet opening for the introduction of an liquid into a main pumping chamber; a discharge outlet extending from the main pumping chamber; and an outer surface of the main pumping chamber for contact with the outer housing for the liner, the outer surface having at least one alignment portion located on a face of the main liner for engaging with a corresponding alignment portion on the outer housing, the engagement of the alignment portion with the corresponding alignment portion limiting movement of the main pumping chamber of the liner relative to the outer housing in a direction parallel to an axis or rotation of an impeller of the centrifugal pump.

In one embodiment the alignment portion protrudes from the outer surface of the main liner.

In one embodiment the alignment portion protrudes from the outer surface of the main liner and is received by a matching recess in the outer housing.

In one embodiment the alignment portion is a central alignment portion.

In one embodiment the alignment portion limits movement in a first lateral direction substantially parallel to an axis or rotation of an impeller of the centrifugal pump.

In one embodiment the alignment portion limits movement in a second lateral direction substantially parallel to an axis or rotation of an impeller of the centrifugal pump.

In one embodiment the alignment portion extends circumferentially around the main liner.

In one embodiment the at least one alignment portion includes a first and a second alignment portion, the first alignment portion limiting movement in a first lateral direction and the second alignment portion limiting movement in a second lateral direction, the first and second lateral directions being substantially parallel to an axis or rotation of an impeller of the centrifugal pump.

In one embodiment the at least one alignment portion further includes a central alignment portion limiting movement in both the first and the second lateral directions.

In one embodiment the at least one alignment portion includes a first alignment portion on an inlet side of the main liner and a second alignment portion on an outlet side of the main liner.

In one embodiment the at least one alignment portion includes an early stage alignment portion and a late stage alignment portion.

In one embodiment the at least one alignment portion is an early stage alignment portion.

In one embodiment the at least one alignment portion is a late stage alignment portion.

In one embodiment the at least one alignment portion is located on a front face of the main liner In one embodiment the at least one alignment portion is located on a rear face of the main liner.

In one embodiment a first alignment portion of the at least one alignment portion is located on a front face of the main liner and a second alignment portion of the at least one alignment portion is located on a rear face of the main liner.

BRIEF DESCRIPTION OF FIGURES

Example embodiments are apparent from the following description, which is given by way of example only, of at least one non-limiting embodiment, described in connection with the accompanying figures, in which.

DETAILED DESCRIPTION

Figure 1:
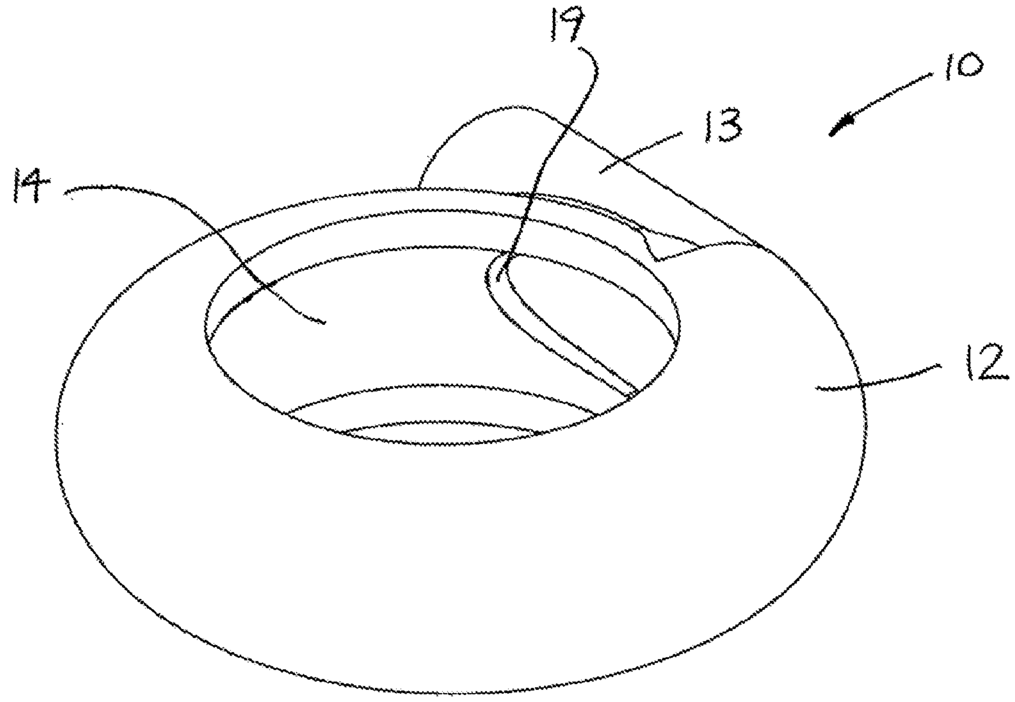
Fig. 1 (Prior Art)
FIG. 1 is a perspective illustration of a conventional main line for a centrifugal pump.

The following modes, given by way of example only, are described in order to provide a more precise understanding of one or more embodiments. In the figures, like reference numerals are used to identify like parts throughout the figures.

Figure 2:
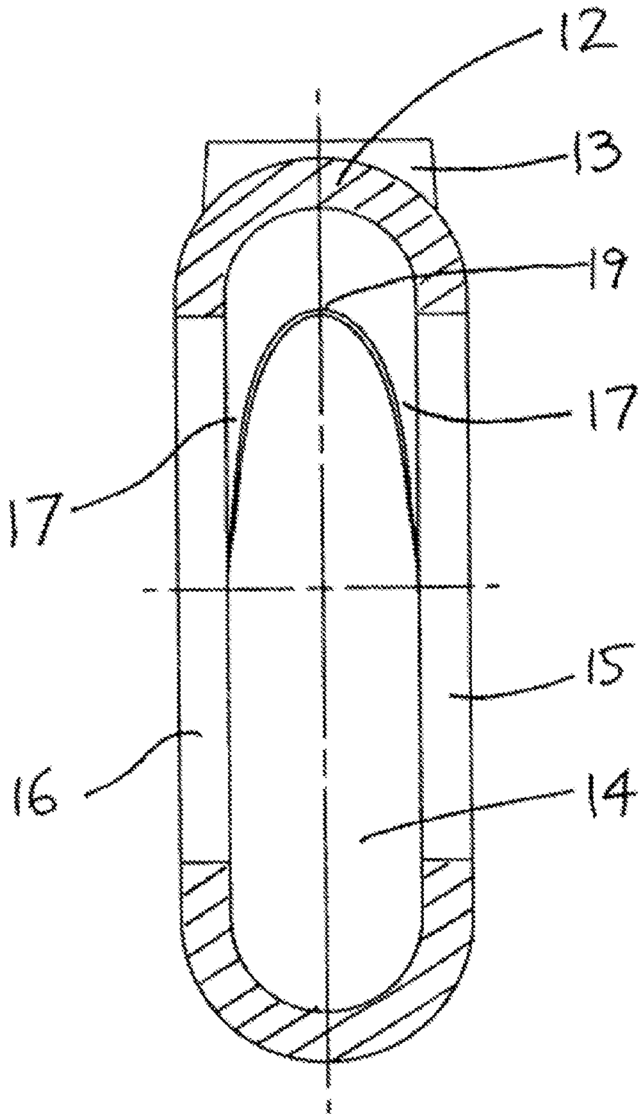
Fig. 2 (Prior Art)
FIG. 2 illustrates a sectional view of the conventional main liner of FIG. 1.

FIGS. 1 and 2 show a main liner 10 for a centrifugal pump. The main liner 10 includes a peripheral wall portion 12 having a pumping chamber 14, also called a collection chamber, therein and opposed sides 15 and 16 (FIG. 2). During use, an impeller is mounted for rotation within the pumping chamber 14 of the main liner. An inlet opening to the pumping chamber 14 is provided on one side of the casing and a drive shaft to which the impeller is mounted extends through the other side. The pumping chamber 14 in the region of the peripheral wall portion 12 is of a volute shape, offset circular shape or any other suitable shape. A discharge outlet 13 extending from the peripheral wall portion 12, there being a cutwater 19 which in use generally serves to divide the discharge outlet flow from the pumping chamber recirculation flow.

In some forms of centrifugal pumps an outer housing is provided to encase the main liner shown in FIGS. 1 and 2. The term "main liner" refers to a chamber which surrounds a pump impeller and in which the impeller can rotate in use of a lined pump. The main liner is itself surrounded by an exterior casing structure. In lined pumps, the main liner, also referred to as a volute liner, is a wear part which is exposed to the movement of an abrasive liquid or slurry during use, and which eventually requires replacement, and the exterior casing or shell of the pump remains undamaged.

The main liner may be formed from an elastomeric material, such as rubber. The main liner may mate with side liners mounted at respective sides 15, 16 of the main liner 10. As seen in FIG. 2, the main liner 10 includes a cutwater 19, having transition zones 17 in the form of tapering blend sections extending from the ends of the arch-shaped cutwater between the discharge outlet 13 and the pumping chamber 14, in the region of the peripheral wall portion 12.

FIGS. 3A, 7A, 8A, 9A, 10A, 11A and 12A show a main liner 300 for a centrifugal pump according to an embodiment of the present invention. The main liner 300 has a main pumping chamber, with the liner being located within an outer housing (not shown). The main liner 300 has an inlet opening for the introduction of a liquid into the main pumping chamber as well as a discharge outlet extending from the main pumping chamber. The discharge outlet has an outer surface for contact with the outer housing. Located on the outer surface is at least one alignment portion for engaging with a corresponding alignment portion on the outer housing. The alignment portion is engaged with the corresponding alignment portion, limiting movement of the discharge outlet. The main liner 300 also has an outer surface of the main pumping chamber for contact with the outer housing. The outer surface has at least one alignment portion for engaging with a corresponding alignment portion on the outer housing. The alignment portion is engaged with the corresponding alignment portion, limiting lateral movement of the main pumping chamber of the liner.

Located on an inlet side of the main liner 300 is an inlet opening 310 through which a fluid, such as a slurry, may pass into a main pumping chamber 315. On the opposite side, a drive side of the pumping chamber 315, is a drive side opening 312 through which a drive shaft for an impeller passes. The impeller, not shown, operates in the main pumping chamber 315 to pump the fluid out a discharge outlet 320 to allow flow of liquid from the main pumping chamber 315. The main pumping chamber 315 is formed by an inner surface 330 and is sealed using side liners that seal the openings, such as the inlet opening 310 and drive side opening 312, around an opening rim 350.

The main liner 300 has an outer surface 340 that is in contact with an outer housing of the centrifugal pump. While the main liner 300 is typically made of an elastomer, the outer housing is typically made of metal and designed to allow replacement of the main liner 300 as required, for example due to wear. When placed inside the outer housing chamber, liner chamber alignment portions 360 and 365 may correctly position the main liner 300 within the outer housing. The alignment portions 360 and 365 are positioned on the outer surface 340 and protrude to engage with and be received by corresponding, or matching, alignment portions on the outer housing. The alignment portion 360 is located on a face of the main liner 300, being a front face on the inlet side of the main liner 300, with the alignment portion 365 located on the face of the main liner 300, being a rear face on the drive side. The alignment portions 360 and 365 may also be considered to be located on a shoulder region of the main liner 300. When engaged with the corresponding alignment portions, the alignment portions 360 and 365 position the main liner 300 relative to the outer housing and limit lateral movement, the lateral movement being substantially parallel to an axis or rotation of an impeller of the centrifugal pump. Each of the alignment portions may limit movement in at least one lateral direction. The alignment portion 360 may limit movement in a first lateral direction and the alignment portion 365 may limit movement in a second lateral direction. Combined, the alignment portions may limit movement in both lateral directions. In one alternative, the main liner 300 may have only one of the alignment portions 360 and 365. For example, alignment portion 360 may be present while alignment portion 365 is not included on the main liner 300. In another example, alignment portion 360 may not be included on the main liner 300 while alignment portion 365 is present.

The alignment portions 360 and 365 are shown extending partially around the outer surface 340. The alignment portions 360 and 365 may be longer or shorter than shown in FIGS. 3A, 7A, 8A, 9A, 10A, 11A and 12A. For example, the alignment portions 360 and 365 may extend all around the outer surface 340. Alternatively, one, or both of the alignment portions 360 and 365 may be formed from two or more discontinuous arcs, formed from two or more alignment portions. A shape of the portions 360 and 365 will be discussed below in relation to FIG. 5.

A central alignment portion 370, is also shown on the outer surface 340. The central alignment portion 370 may operate in a similar manner to the alignment portions 360 and 365 by engaging with a corresponding, or matching, central alignment portion on the outer housing. When engaged, the central alignment portion 370 aligns the main liner 300 with the outer housing and may limit lateral movement of the outer surface 340 relative to the outer housing in two directions, the lateral direction being substantially parallel to an axis or rotation of an impeller of the centrifugal pump. The central alignment portion 370 protrudes from and extends around the external circumference of the main liner 300, starting near a flange 380 of the discharge outlet 320. As with the alignment portions 360 and 365, the central alignment portion 370 may be shorter or formed from two or more discontinuous segments. A shape of the central alignment portion 370 will be discussed in more detail below in relation to FIG. 5. The central alignment portion 370 is located at a central portion of the main liner 300.

Figure 3A:
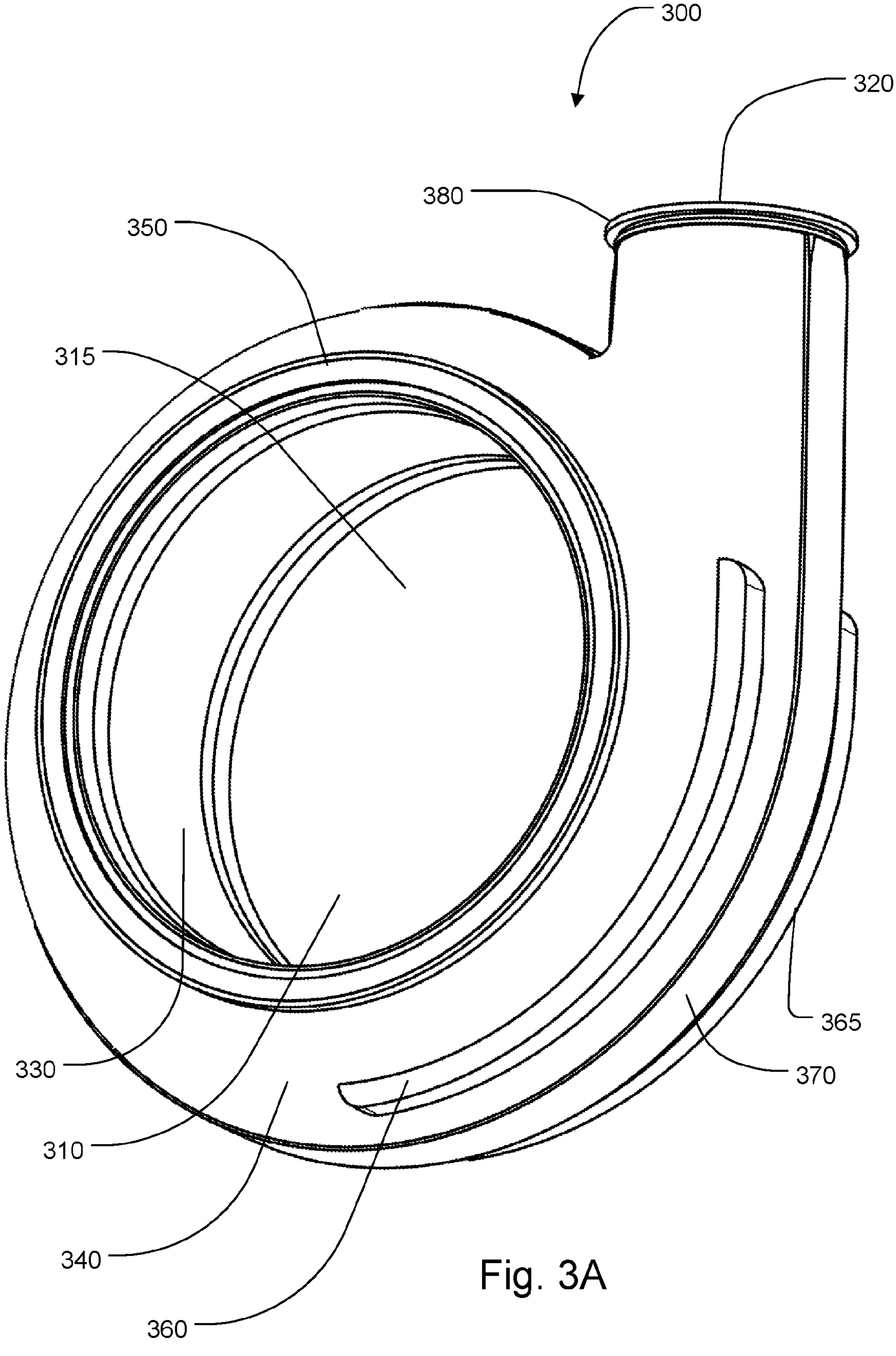
FIGS. 3A and 3B are perspective illustrations of a main liner for a centrifugal pump according to a first and second embodiment.
Figure 3B:
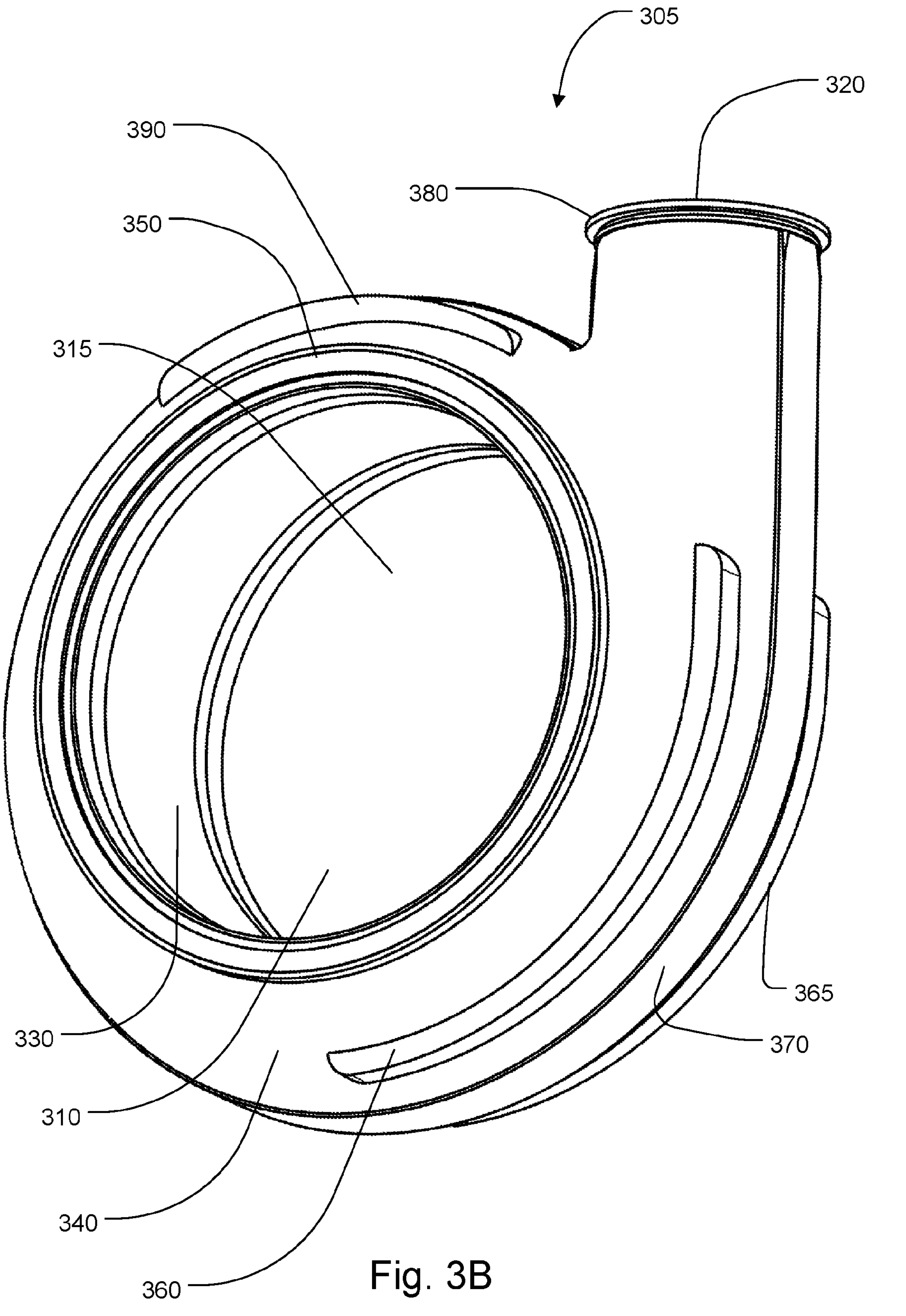

FIGS. 3B. 7B, 8B, 9B, 10B, 11B and 12B show a main liner 305. The main liner is similar to the main liner 300, incorporating the features of the main liner 300 described above in FIGS. 3A, 7A, 8A, 9A, 10A, 11A and 12A. However, the main liner 305 has two additional alignment portions located on the outer surface 340 of the main liner 305. An alignment portion 390 is located on the inlet side of the main liner 305, with an alignment portion 395 located on the drive side.

Figure 8A:
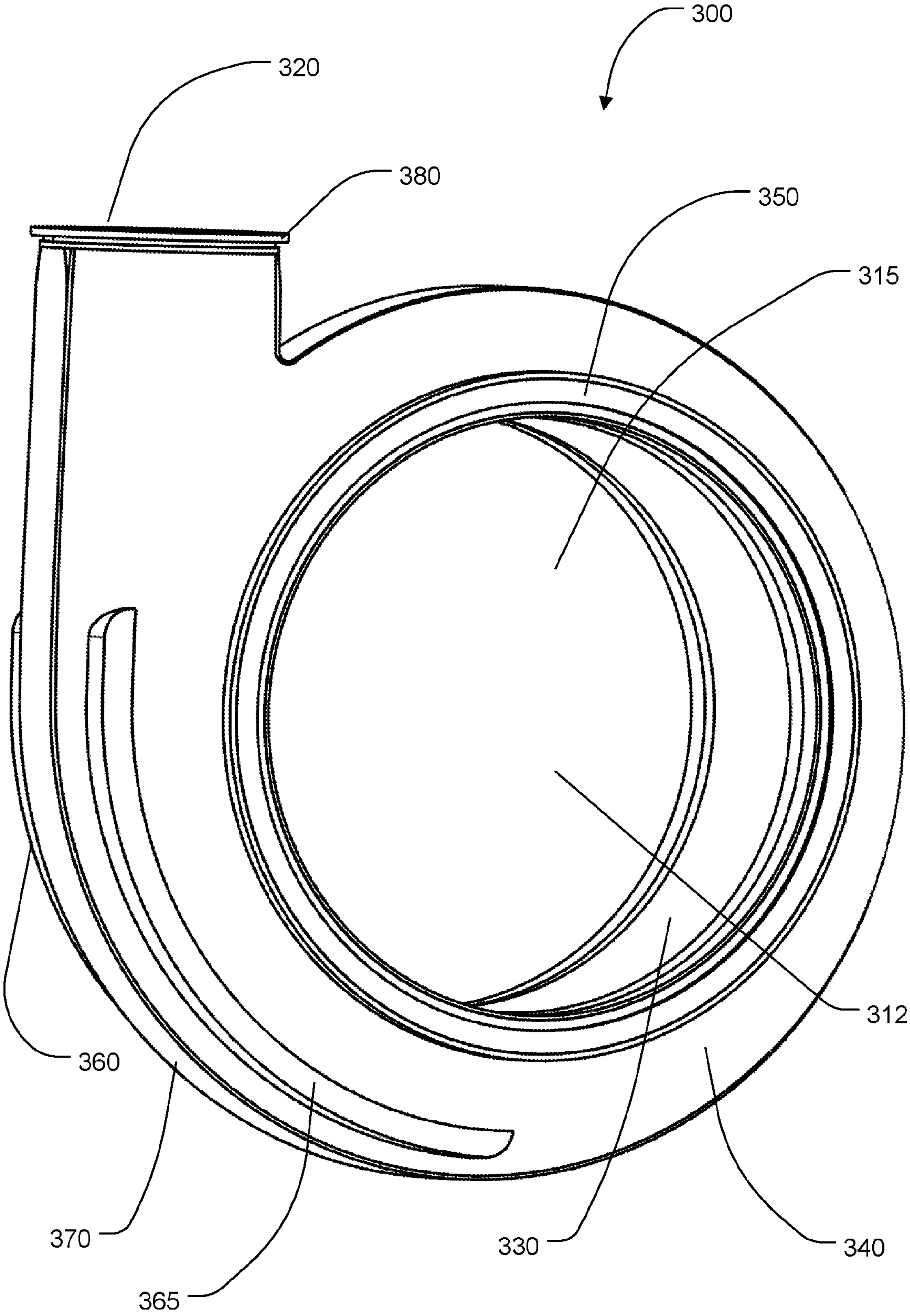
FIGS. 8A and 8B are perspective illustrations of the main liner of FIGS. 3A and 3B respectively.
Figure 8B:
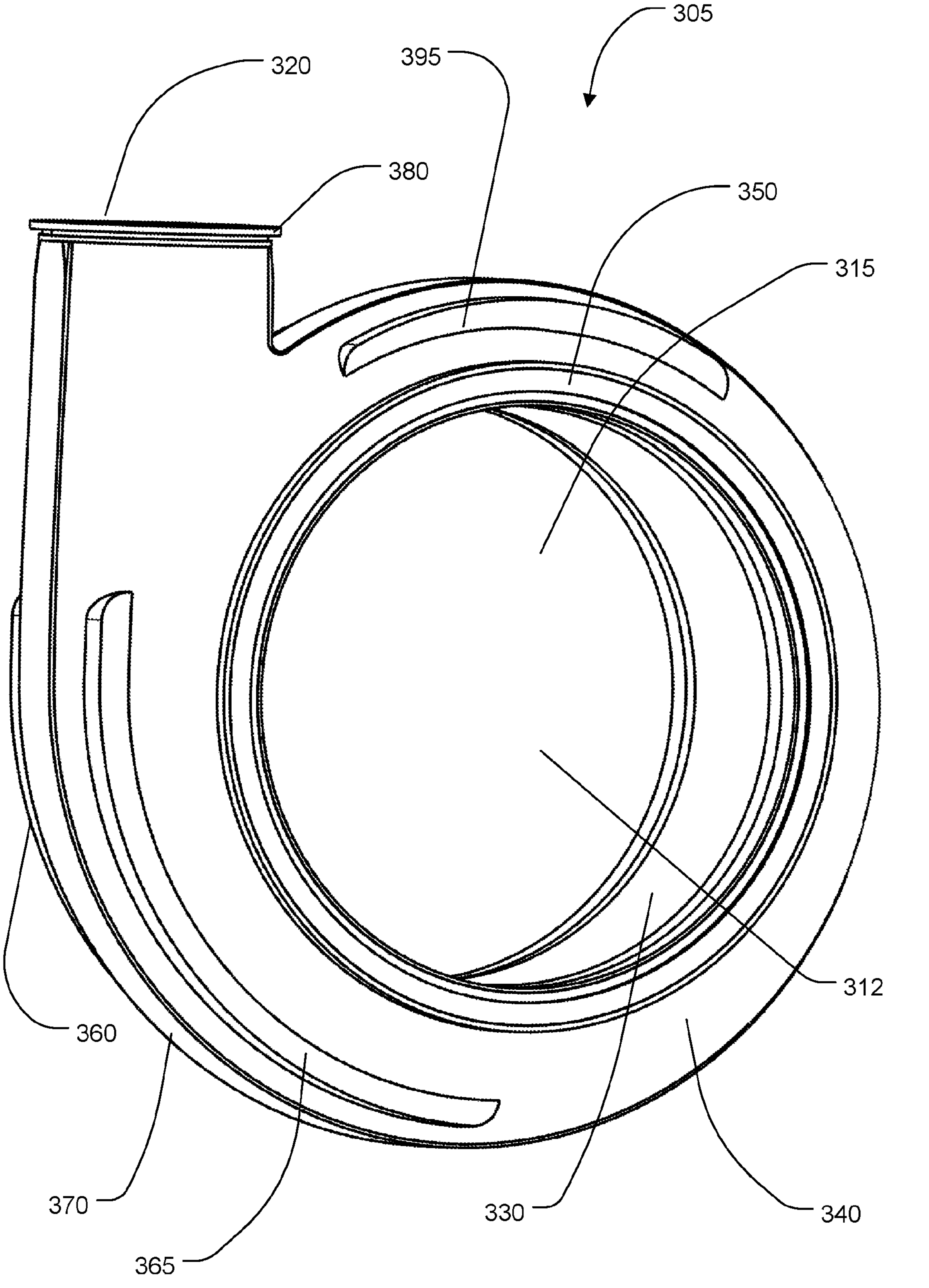
Figure 9A:
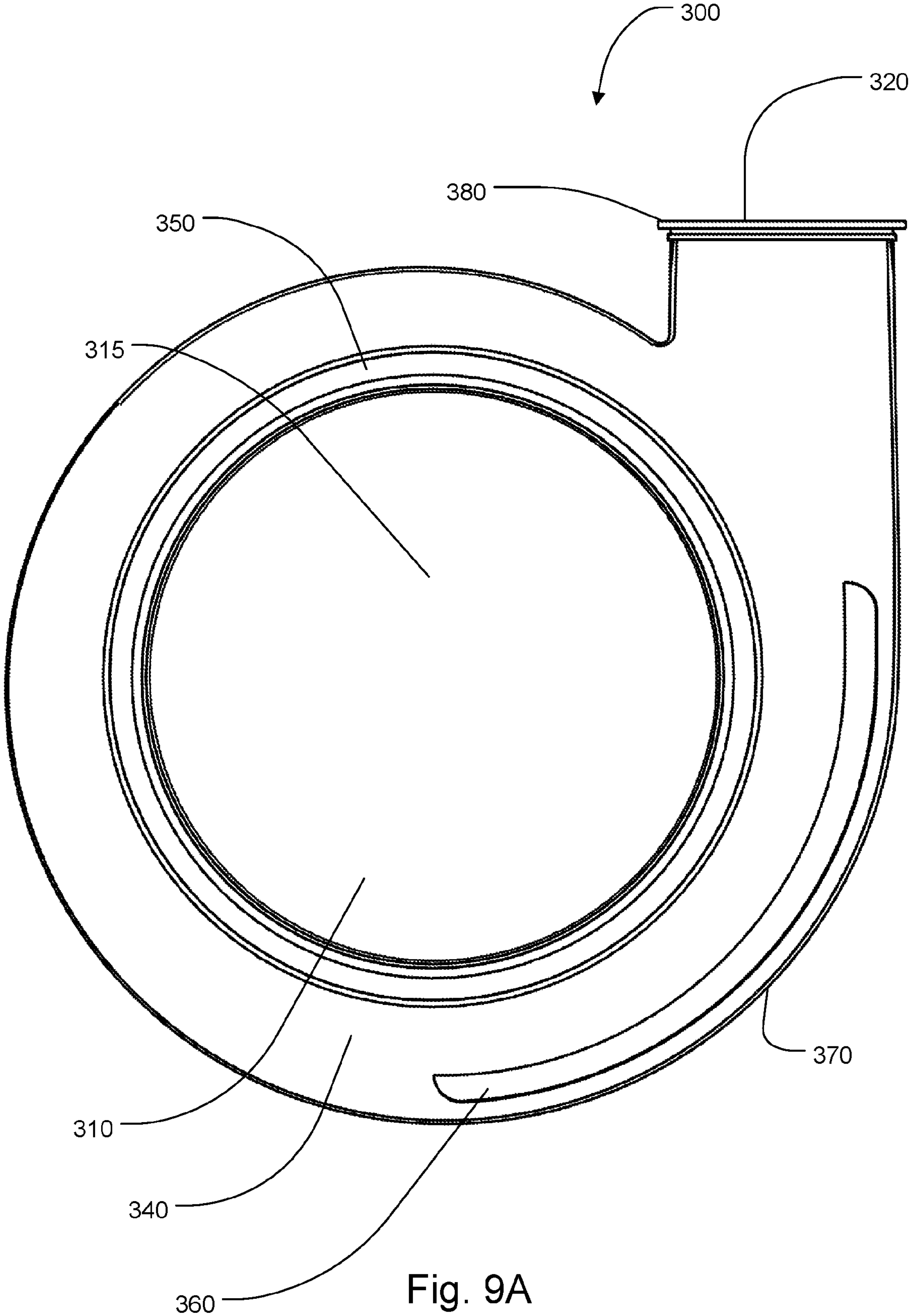
FIGS. 9A and 9B are perspective illustrations of the main liner of FIGS. 3A and 3B respectively.
Figure 9B:
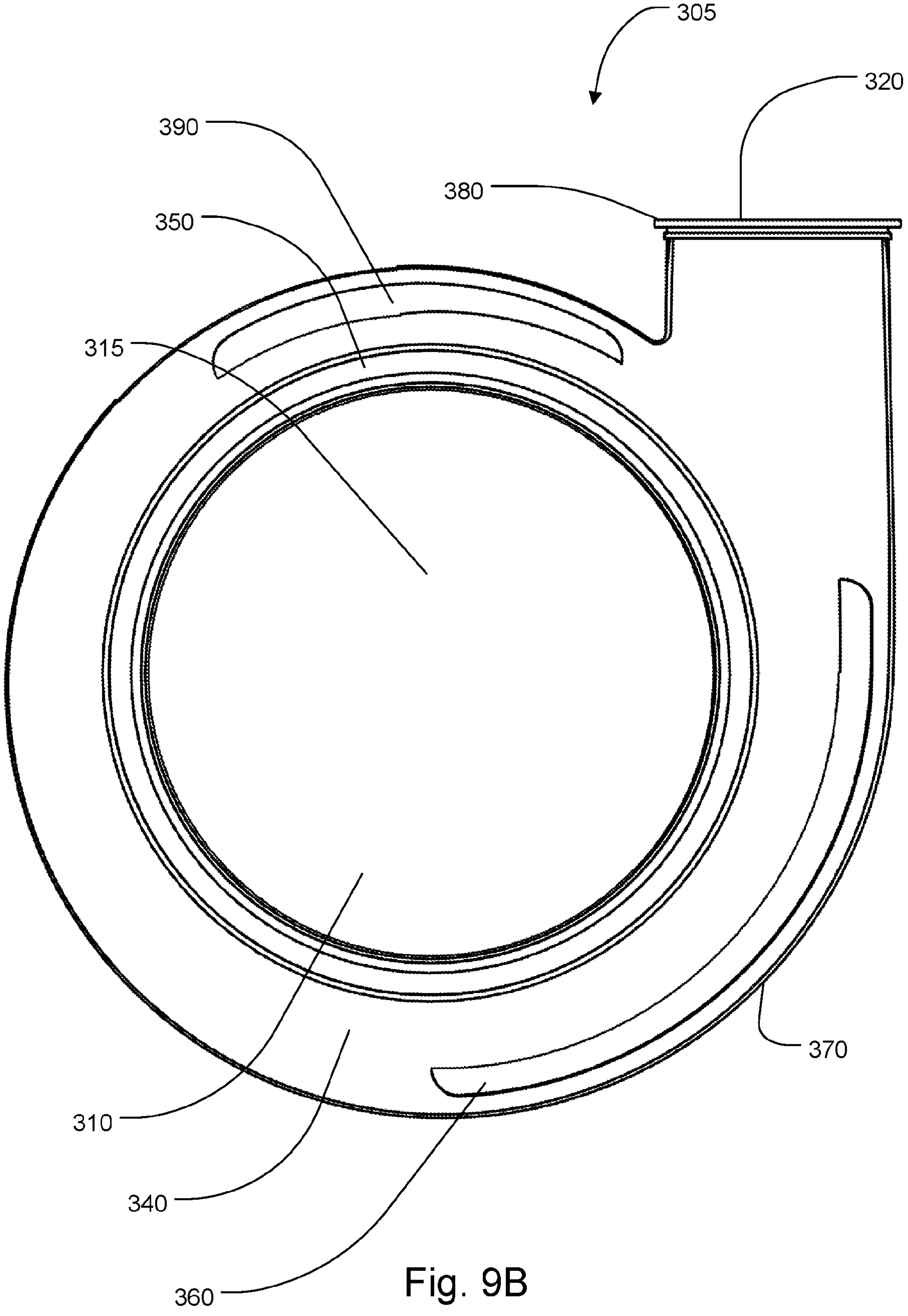
Figure 10A:
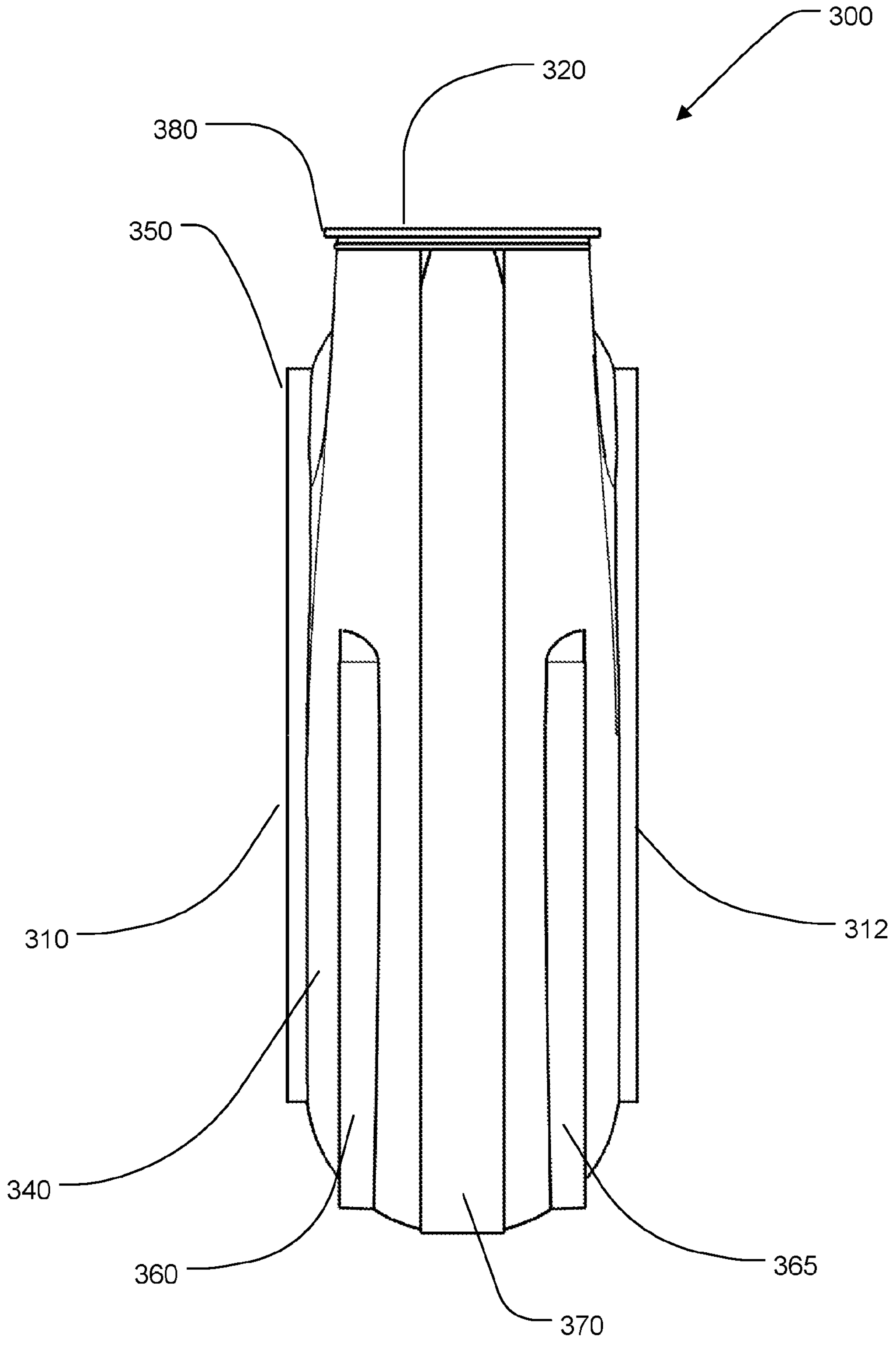
FIGS. 10A and 10B are perspective illustrations of the main liner of FIGS. 3A and 3B respectively.
Figure 10B:
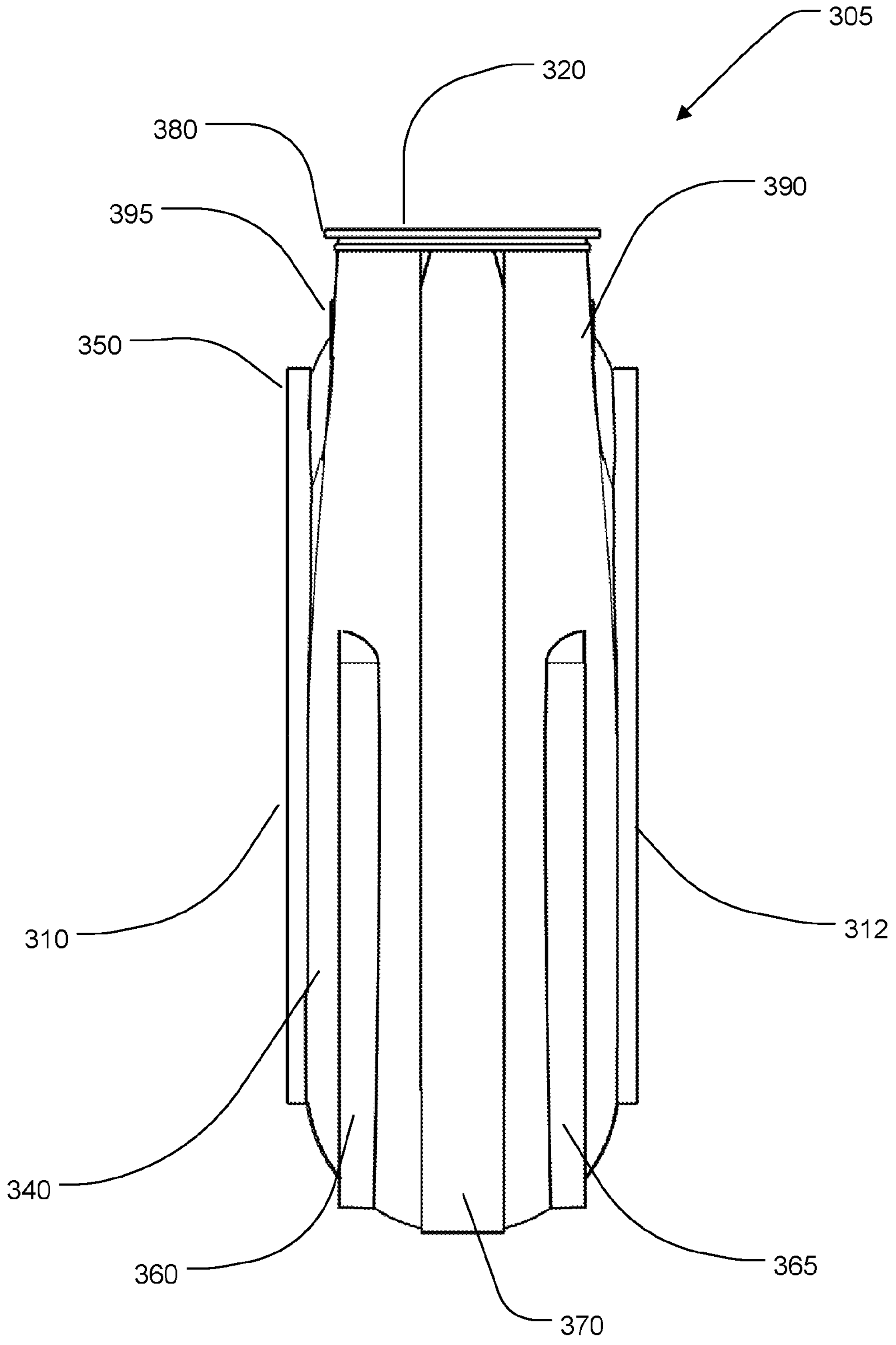
Figure 11A:
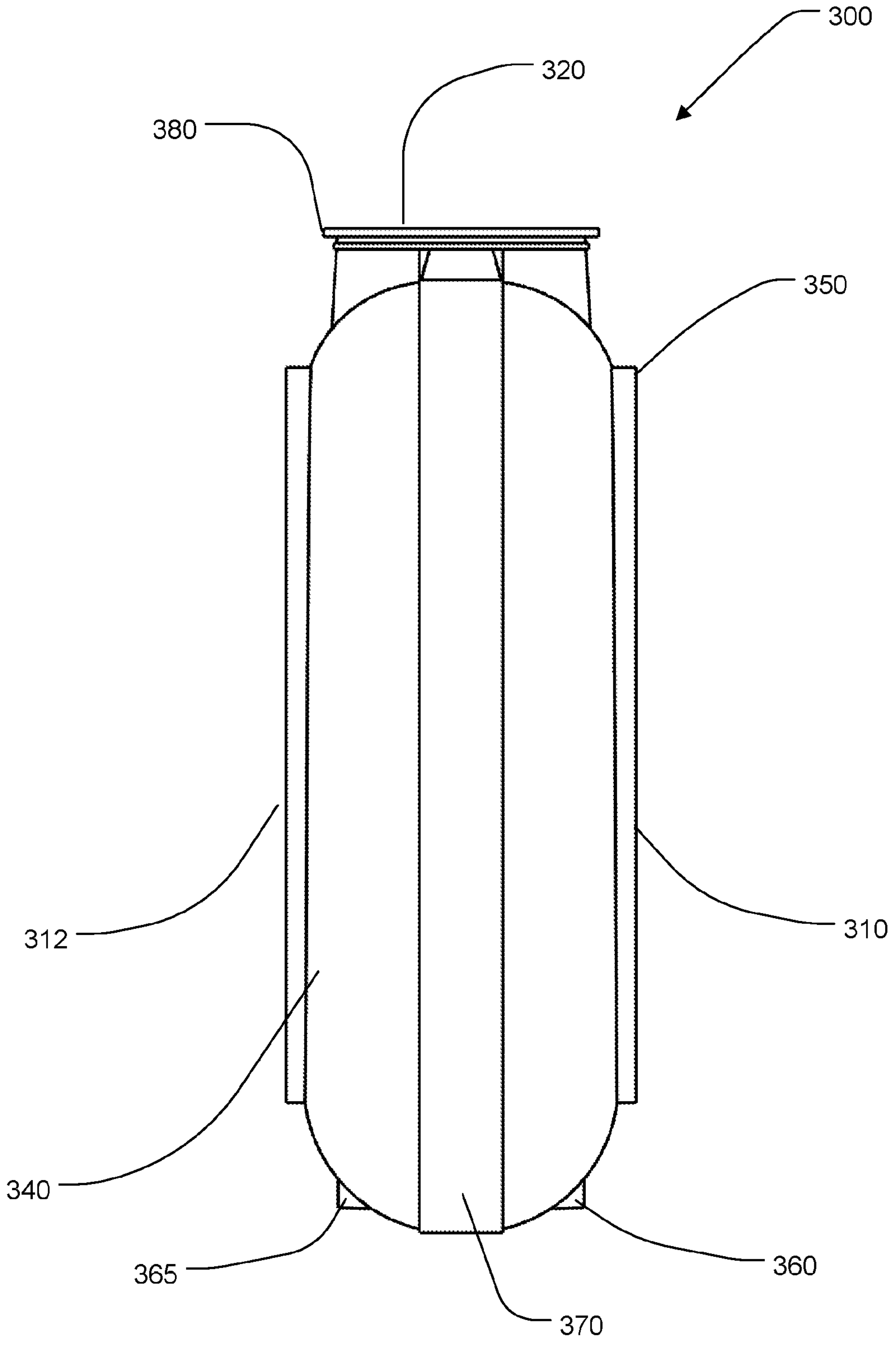
FIGS. 11A and 11B are perspective illustrations of the main liner of FIGS. 3A and 3B respectively.
Figure 11B:
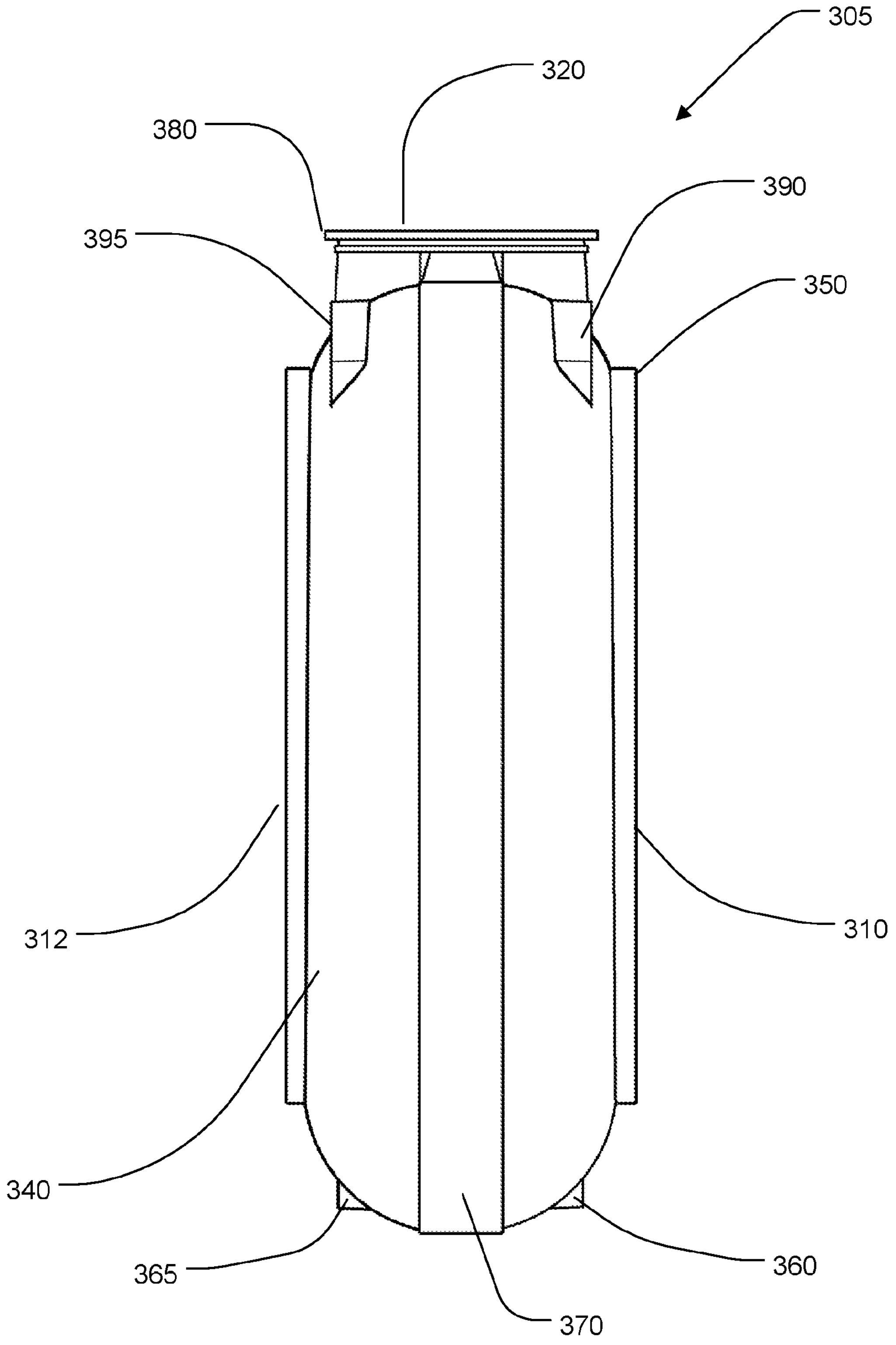
Figure 12A:
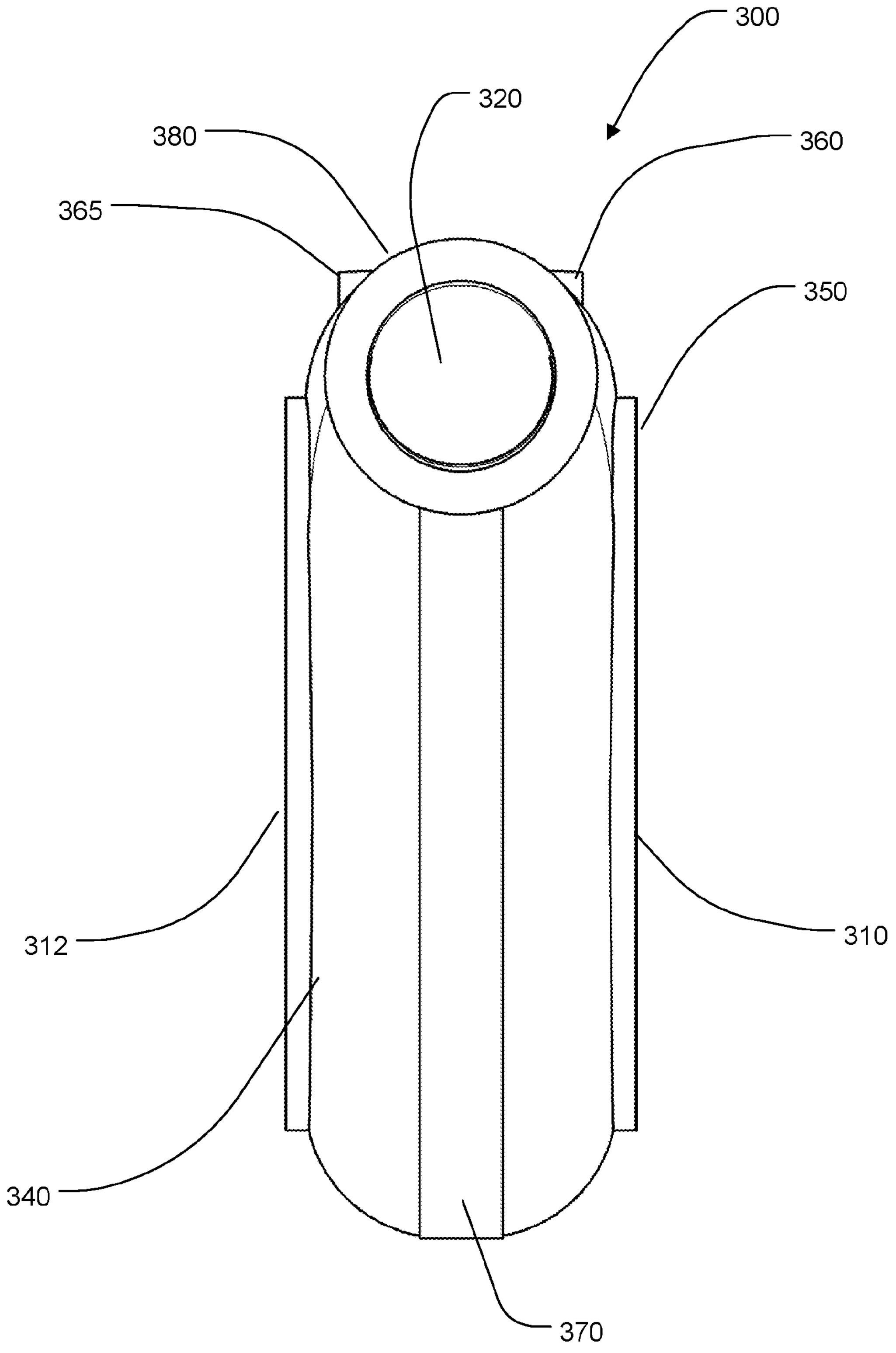
FIGS. 12A and 12B are perspective illustrations of the main liner of FIGS. 3A and 3B respectively.
Figure 12B:
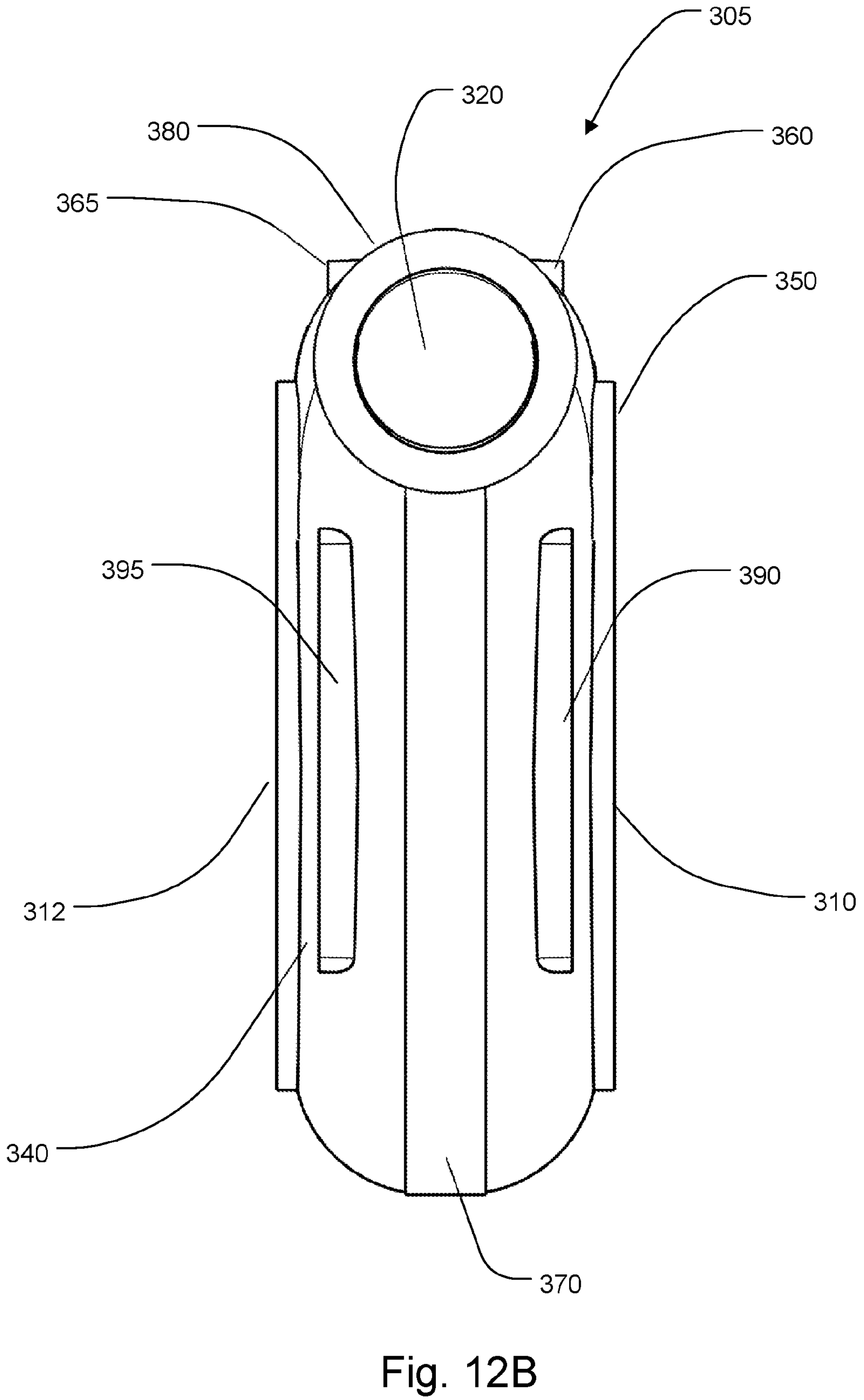

The main pumping chamber 315 has a recirculation flow that is sent to the discharge outlet 320. The flow of the fluid in the pumping chamber 315 may be considered a flow path of circulation for the liquid with the discharge outlet being the last part of the flow path. The flow path will travel in a circular direction within the pumping chamber 315, based on the direction of spin of the impeller. For FIG. 3B the direction of the flow will be counter clockwise, while for FIG. 8B the direction of flow will be clockwise as the main liner 305 is viewed from the drive side in FIG. 8B. The alignment portions 390 and 395 are located on the outer surface 340 at an earlier stage of the flow path, compared to the alignment portions 360 and 365 which are located at a later stage of the flow path. The alignment portions may be termed early stage alignment portions 390 and 395 and late stage alignment portions 360 and 365. Alternatively, the alignment portions 390 and 395 may be considered to be positioned at, or near, a start of the flow path, while the alignment portions 360 and 365 may be considered to be at or near an end of the flow path. The alignment portions may be termed start of flow alignment portions 390 and 395 and end of flow alignment portions 360 and 365. Alternatively, the alignment portions 390 and 395 may be considered to be located wholly outside the main pumping chamber 315 while the alignment portions 360 and 365 may be considered to extend on to an outer surface of the discharge outlet. The alignment portions may be termed pumping chamber alignment portions 390 and 395 and partial discharge outlet alignment portions 360 and 365. A combination of such terms may also be used. Alternatively, the alignment portions 390 and 395 may be considered to extend perpendicular to the axis of the discharge outlet 320 and the alignment portions 360 and 362 may be considered to extend parallel to the axis of the discharge outlet 320. As such, the alignment portions may be termed the perpendicular alignment portions 390 and 395 and the parallel alignment portions 360 and 365.

When placed inside the outer housing chamber, early stage alignment portions 390 and 395 may correctly position the main liner 305 within the outer housing. The early stage alignment portions 390 and 395 are positioned on the outer surface 340 and protrude to engage with and be received by corresponding, or matching, alignment portions on the outer housing. The early stage alignment portion 390 is located on the face of the main liner 300, being a front face on the inlet side of the main liner 305, with the alignment portion 395 located on the face of the main liner 300, being a rear face on the drive side. The alignment portions 390 and 395 may also be considered to be located on the shoulder region of the main liner 300. When engaged with the corresponding alignment portions, the early stage alignment portions 390 and 395 position the main liner 305 relative to the outer housing and limit lateral movement substantially parallel to an axis or rotation of an impeller of the centrifugal pump. Each of the alignment portions may limit movement in at least one lateral direction. The early stage alignment portion 390 may limit movement in a first lateral direction and the alignment portion 395 may limit movement in a second lateral direction. Combined, the alignment portions may limit movement in both lateral directions. In one alternative, the main liner 300 may have only one of the alignment portions 390 and 395. For example, alignment portion 390 may be present while alignment portion 395 is not included on the main liner 300. In another example, alignment portion 390 may not be included on the main liner 300 while alignment portion 395 is present.

The early stage alignment portions 390 and 395 are shown extending partially around the outer surface 340. The early stage alignment portions 390 and 395 may be longer or shorter than shown in FIGS. 3B, 7B, 8B, 9B, 10B, 11B and 12B. For example, the early stage alignment portions 390 and 395 may extend further around the outer surface 340, in the flow direction, towards the late stage alignment portions 360 and 365. Alternatively, one, or both of the early stage alignment portions 390 and 395 may be formed from two or more discontinuous arcs, formed from two or more alignment portions. A shape of the early stage alignment portions 390 and 395 may be the same or similar to the late stage portions 360 and 365 which are discussed below in relation to FIG. 5.

The early stage alignment portions 390 and 395 may be used to locate the main liner 305 relative to the outer housing when installing the main liner 305. Additional alignment portions may also be added to the main liner 305. For example, a mid stage alignment portion may be located between the early stage alignment portions 390 and 395 and the late stage alignment portions 360 and 365. The mid stage alignment portions may assist in locating the main liner relative to the outer housing. The alignment portions 390, 395, 360 and 365 may be located on the outer surface 340 wherever positioning of the main liner 305 in the outer housing is important or for areas where misalignment tolerances are lower. An example is the location of the early stage alignment portions 390 and 395 being close to the discharge outlet 320 as the position allows the discharge outlet to be more accurately positioned relative to the outer housing.

A configuration of the discharge outlet 320 will now be described in relation to a liner 400 of FIG. 4. The flange 380 extends about the discharge outlet 320 and is a continuous, circumferential, outwardly projecting flange having a radially extending lip. Two alignment portions for the outer housing are shown. The first is housing outlet alignment portion 410 of the outer housing which is positioned in contact with the flange 380 and acts to position the discharge outlet 320. The first housing alignment portion 410 limits movement of the flange 380, and the discharge outlet 320, in a single axial direction of the discharge outlet 320 towards the main pumping chamber 315. That is, the first alignment portion 410 limits movement of the discharge outlet 320 in a direction opposite to a flow direction of the liquid as the liquid exits the discharge outlet 320. In addition to limiting axial movement, the first alignment portion 410 may also limit radial movement and distortion of the discharge outlet 320.

Figure 4:
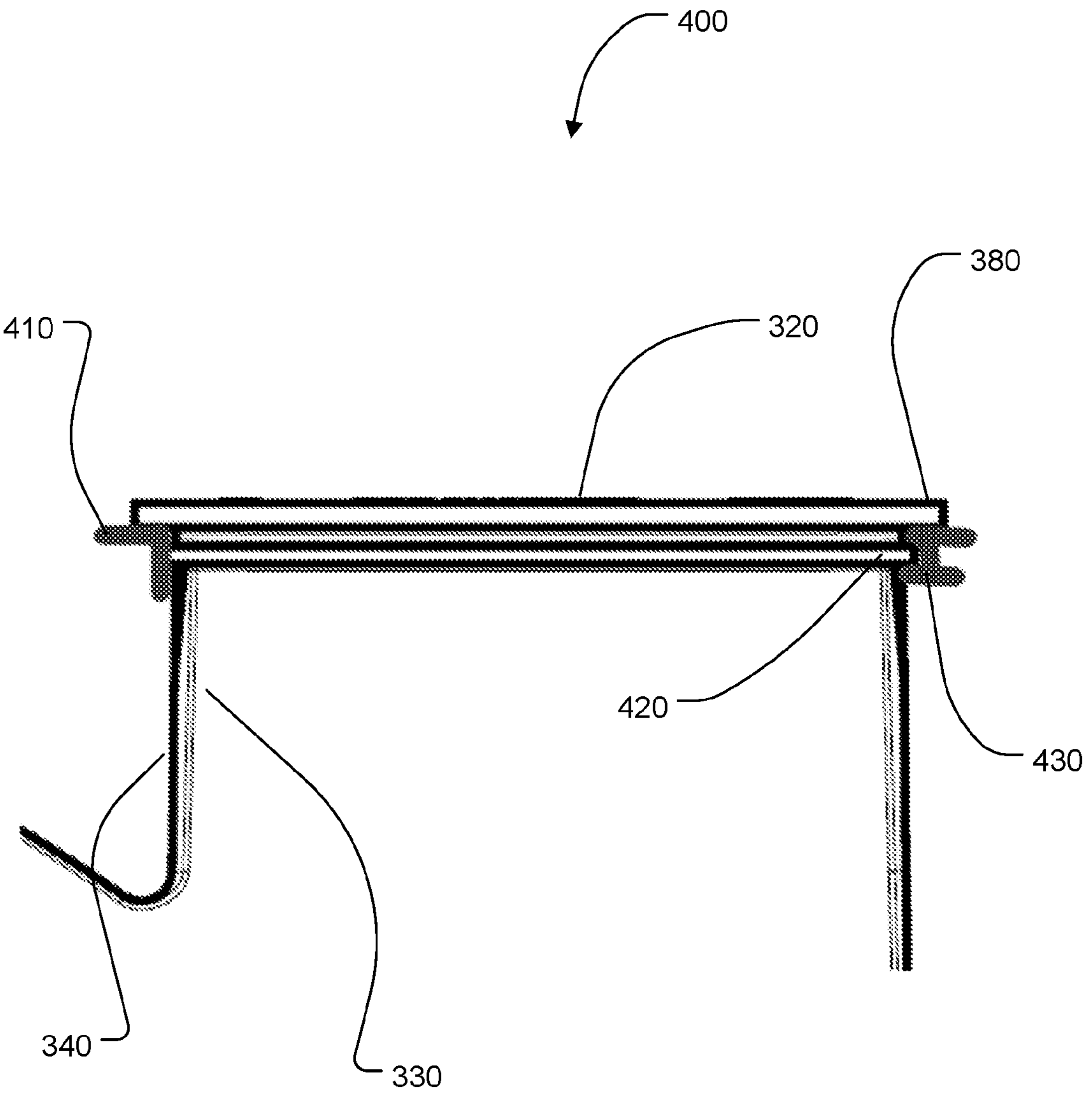
FIG. 4 illustrates a section view of an outlet port of a main liner according to one embodiment.

A second housing outlet alignment portion 430 of the outer housing is also shown in FIG. 4 engaging with a liner outlet alignment portion 420. The liner outlet alignment portion 420 is shown as a continuous, circumferential, outwardly projecting flange having a radially extending lip that engages with a recess of the second housing alignment portion 430. As a result of the engagement between the two alignment portions, movement of the main liner 300 is reduced or even limited in either direction axially of the discharge outlet 320. In contrast to the first housing alignment portion 410, the second housing alignment portion 430 provides an additional limitation to axial movement. While the first alignment portion 410 limits movement of the discharge outlet 320 towards the main pumping chamber 315, the second housing alignment portion 430 limits movement away from the pumping chamber 315 in addition to limiting movement towards the main pumping chamber 315. That is, the second housing alignment portion 430 limits movement of the discharge outlet 320 in a direction of the flow, as well as a direction opposite to the flow of the liquid as the liquid exits the discharge outlet 320. This may be beneficial to assist in ensuring proper orientation of the liner as support is provided for the outer housing and seal at the discharge outlet 320. This may also be beneficial when pumping forces attempt to rotate the main liner 300 that results in axial movement along the discharge outlet 320. Limiting the movement of the discharge outlet 320 may also assist in maintaining a seal of the discharge outlet 320 with attached piping.

While FIG. 4 shows the second housing alignment portion 430 with a recess for receiving the liner outlet alignment portion 420 protrusion, alternative arrangements may also be used. For example, the second housing alignment portion 430 may be a protrusion that is received and/or engaged by a recess in the liner outlet alignment portion 420. In an alternative embodiment, the use of first and second alignment portions may be replaced by the use of either the first or the second alignment portions alone. In such an arrangement the first alignment portion 410, the second alignment portion 430 and/or the liner outlet alignment portion 420 may extend around all of the discharge outlet 320 or a portion of the discharge outlet 320. Alternatively, the alignment portions may be located around the discharge outlet 320 in two or more discontinuous sections.

Figure 5:
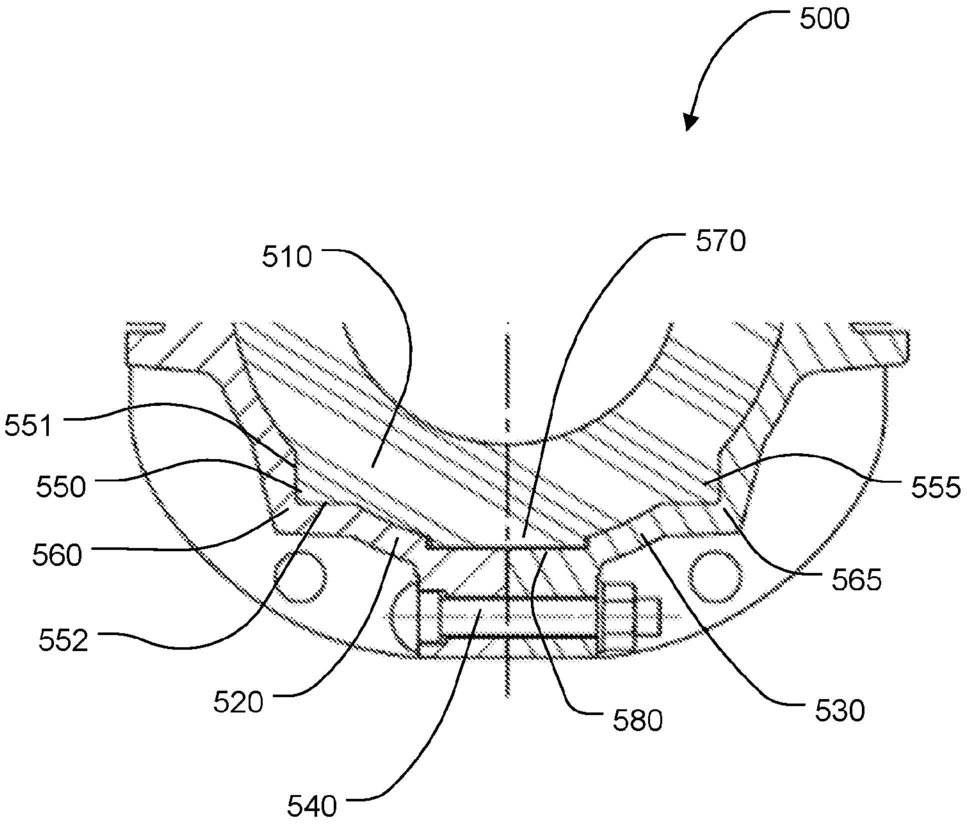
FIG. 5 illustrates a cross sectional view of a centrifugal pump with the main liner of FIG. 3A.

FIG. 5 illustrates a cross section of centrifugal pump 500 with a main liner 510 having alignment portions engaging with corresponding alignment portions of an outer housing. The outer housing of FIG. 5 has a left side outer housing 520 and a right side outer housing 530. The two sides of the outer housing are connected together by fasteners such as connection bolt 540.

Typically the two sides of the outer housing may be separated to allow access to, and replacement of, the main liner 510.

Located on the main liner 510 are a left liner alignment portion 550 and a right liner alignment portion 555. The two alignment portions of the main liner 510 protrude to engage with corresponding, recessed, alignment portions on the outer housing, being the left housing alignment portion receiver 560 and the right housing alignment portion receiver 565. Also shown in FIG. 5 is a protruding central liner alignment portion 570 and a corresponding central housing alignment portion receiver 580. The central alignment portion receiver 580 is formed from recesses in the left and right side of the outer housing 520 and 530.

The liner alignment portions, located on the liner 510, are shown as protrusions from an outer surface of the main liner 510 engaging with the corresponding alignment portions recessed in the outer housing. In an alternative embodiment, one or more of the alignment portions located on the main liner 510 may be formed from recesses and engage with corresponding alignment portions formed from protrusions located on the outer housing. However, one consideration that should be factored into determining a shape and location of the alignment portions is how the main liner 510 is placed inside the outer housing. For example, if the central liner alignment portion 570 was recessed, instead of protruding as seen in FIG. 5, then the central housing alignment portion 580 will protrude to allow for engagement. When the left side outer housing 520 and the right side outer housing 530 are separated the central housing alignment portion 580 will be separated. When closing the sides of the outer housing, it may be difficult for the recessed central liner alignment portion 570 to fully engage with the protruding central housing alignment portion until the two sides of the housing are closed together. However it may not be easy, or even possible, to ensure the engagement of the central alignment portions has occurred once the outer housing is closed. Such a problem may be reduced by offsetting the protruding central alignment portion so the portion sits on only one half of the outer housing. Alternatively, the housing may be tapered.

In addition to allowing engagement, a shape of the alignment portions may also determine directional resistance to forces on the main liner 510. For example, the left liner alignment portion 550 is shaped to limit movement of the main liner 510 to the left and downwards, as shown in FIG. 5. Force applied to the main liner 510 to move left is counteracted by surface 551. In a similar manner, the surface 552 may limit movement of the liner downwards (in the direction of the surface 552). Combined, the two surfaces 551 and 552 may limit movement of the main liner 510 in directions with a component left or down. In an alternative embodiment, the slope of the surfaces 551 and 552 may be modified to provide better resistance to forces. For example, the surface 551 may be sloped to provide resistance to a force having an upwards component. In another alternative, the surface 551 and 552 may be curved or additional surface, or facets, added.

The right alignment portion 555 and alignment portion receiver 565 will work in a similar manner to limit movement to the right, downwards or for some combination of the two directions. As with the left alignment portion 550 and alignment portion receiver 560, the shape of the alignment portions may be varied.

The central alignment portion 570 and central alignment portion receiver 580 may limit movement to the left, right, downwards or some combination of those directions. While the central liner alignment portion 570 forms only a small protrusion, a larger protrusion may be used when larger lateral forces may act on the main liner 510. The protrusion shape may also be changed. In one embodiment, the central alignment portion 570 and central alignment portion receiver 580 may be formed in a dovetail shape. Such a shape may limit the main liner 510 pulling away from the outer housing.

Figure 6:
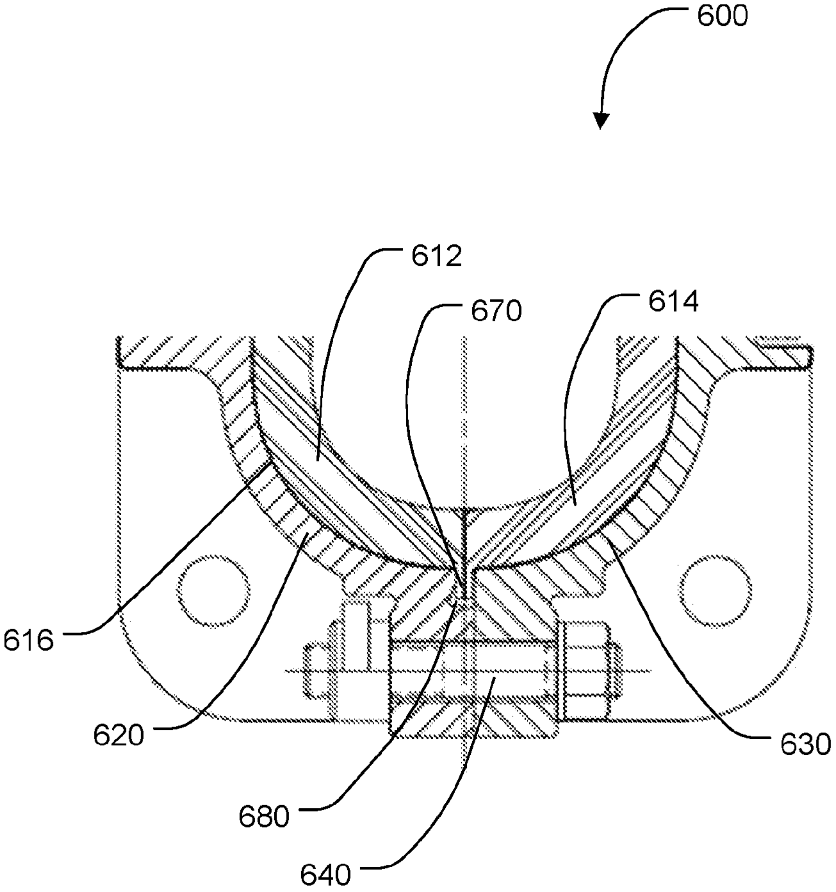
Fig. 6 (Prior Art)
FIG. 6 illustrates a cross section view of a conventional main liner for a centrifugal pump.
Figure 7A:
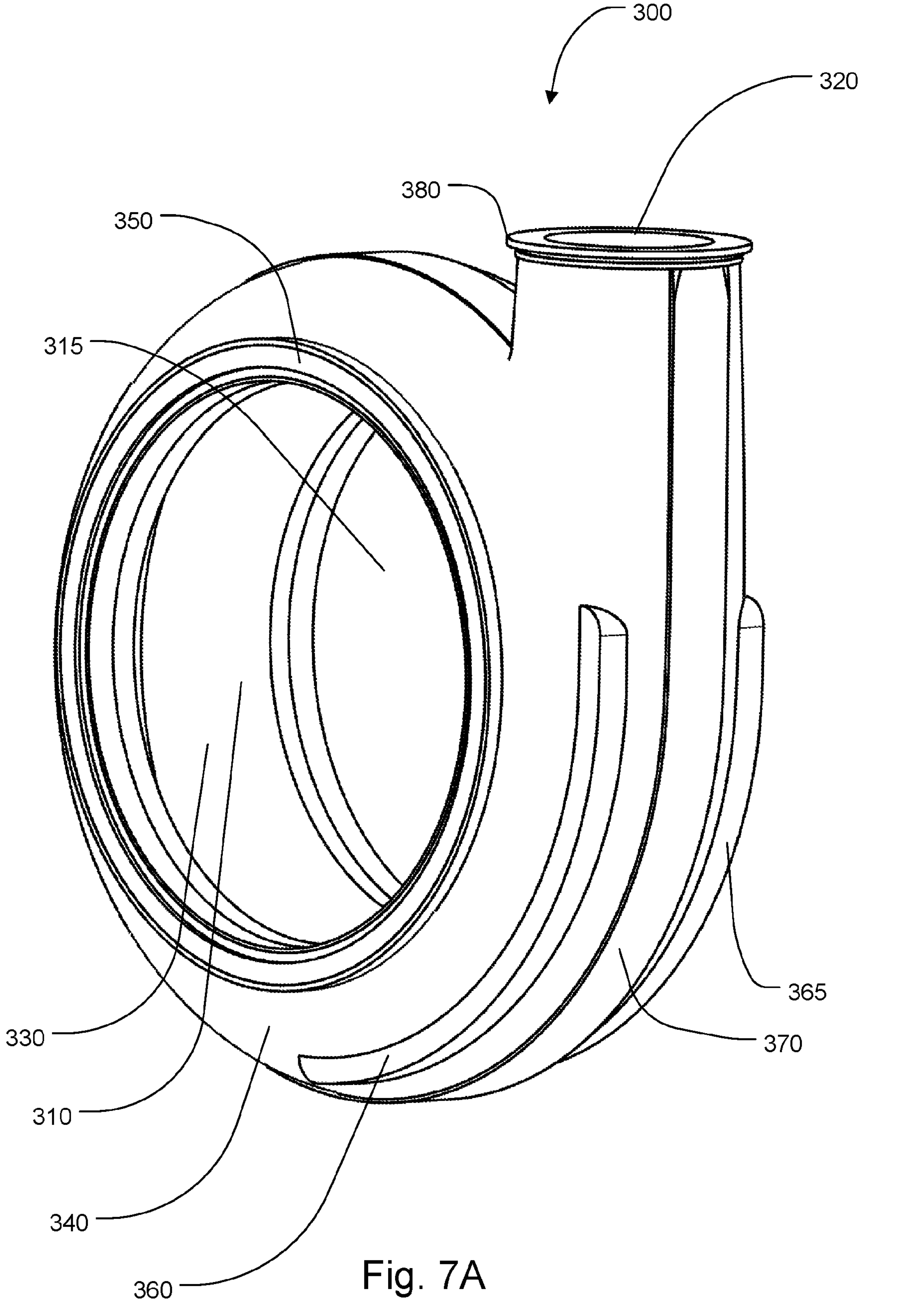
FIGS. 7A and 7B are perspective illustrations of the main liner of FIGS. 3A and 3B respectively.
Figure 7B:
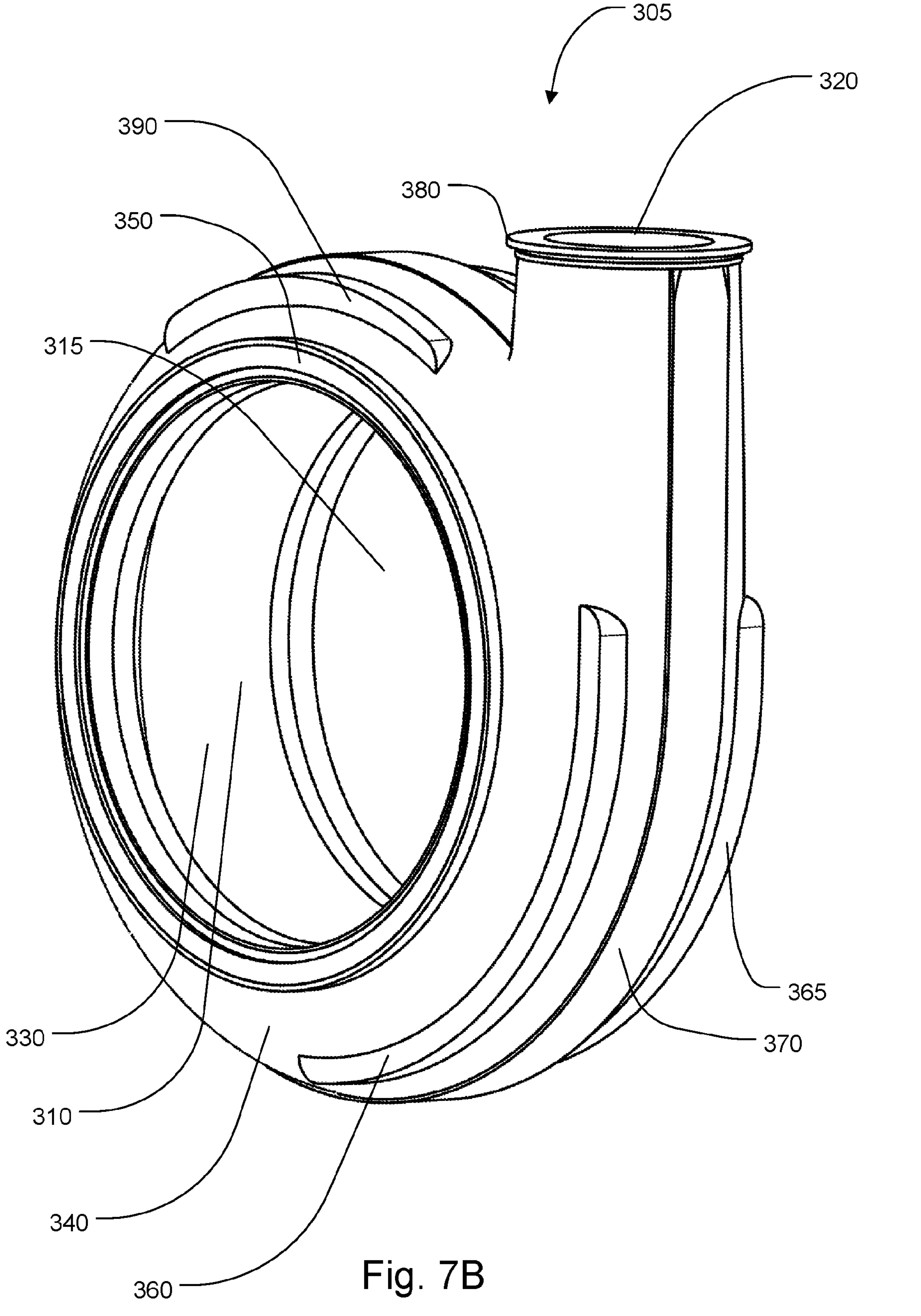

A conventional main liner will now be described in relation to the centrifugal pump 600 of FIG. 6. The main liner is formed from two parts, a left side main liner 612 and a right side main liner 614 with an outer surface 616 which is in contact with a two part outer housing formed from a left side outer housing 620 and a right side outer housing 630. The two parts of the outer housing are joined together by fasteners, such as the connection bolt 640.

The main liner has a single alignment portion to engage with the outer housing. Located on both sides of the main liner is a protruding alignment portion 670 and a corresponding central housing alignment portion 680. Unlike the central housing alignment portion 570 of FIG. 5, the central housing alignment portion 680 is formed from a recess in only the left side outer housing 620 and may reduce manufacturing complexity by limiting the recess to one part. However, such an arrangements may not provide sufficient alignments of the main liner with the outer housing before sealing the outer housing parts together. For example, the right side outer housing 630 and the right side main liner 614 may not correctly align using only the liner alignment portion 670. The liner alignment portion 670 may be clamped between the left and right outer housing 620 and 630. The clamping assists to maintain a position of the main liner as well as to assist in maintaining a seal between the left and right sides of the main liner. When clamped, the housing alignment portion 670 may limit movement of the liner in any direction.

Returning to the liner 500 of FIG. 5. The liner 500 may also be formed from two or more parts in a manner similar to the left side main liner 612 and the right side main liner 614. An example would be if the liner 500 is formed from two parts, a left and a right part. The central alignment portion of the liner 600 may be used instead of the central alignment portion of the liner 500.

While the alignment portions have been described as limiting or reducing movement of the main liner, in respect to the outer housing, such movement may occur in a localised manner. For example, the movement may not be for the entire main liner. Instead the alignment portions may limit or prevent local deformation, assist the main liner to maintain an intended shape, maintain a location relative to the outer housing or a combination of the above. Prevention of deformation may allow the main liner to operate more efficiently as deformation of the main liner may reduce the efficient movement of the liquid over the inner surface of the main liner as a shape of the main liner no longer matches an intended operational shape.

ADVANTAGES

The embodiments described above provide a novel main liner for a centrifugal pump. The main liner uses one of more alignment portions on a surface of the main liner that may assist in positioning the main liner as well as keeping the main liner in position relative to an outer housing. The alignment portions may also assist in keeping the main liner in position, relative to the outer housing, during operation of the centrifugal pump as well as assist in maintaining a suitable shape of the main liner.

The alignment portions located on the discharge outlet of the main liner may also assist in maintaining a seal between the main liner and a pipe attached to the discharge outlet. The discharge outlet may be held in position by the alignment portions and maintain the seal during pumping operations.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as “front” and “rear”, “above” and “below” and the like are used as words of convenience to provide reference points and are not to be construed as limiting terms.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that modifications, changes, substitutions or alterations will be apparent to those skilled in the art without departing from the scope of the present invention.

Throughout this specification and the claims which follow, unless the context requires otherwise, the word “comprise”, and variations such as “comprised”, “comprises” or “comprising”, will be understood to imply the inclusion of a stated integer or step or group of integers or steps but not the exclusion of any other integer or step or group of integers or steps.

As used herein, a, an, the, at least one, and one or more are used interchangeably, and refer to one or to more than one (i.e. at least one) of the grammatical object. By way of example, “an element” means one element, at least one element, or one or more elements.

In the context of this specification, the term “about” is understood to refer to a range of numbers that a person of skill in the art would consider equivalent to the recited value in the context of achieving the same function or result.

The invention claimed is:

1. A main liner formed from an elastomeric material and suitable for positioning within an outer housing of a centrifugal pump, the main liner comprising:

a main pumping chamber;

an inlet opening on an inlet side of the main liner for introduction of a slurry into the main pumping chamber;

a discharge outlet extending from the main pumping chamber; and a drive opening on a drive side opposite the inlet side, wherein the main liner includes a first alignment portion positioned on and protruding from an outer surface of the inlet side and a second alignment portion positioned on and protruding from an outer surface of the drive side, the alignment portions extending from near the discharge outlet partially around the pumping chamber to limit movement of the main liner relative to the outer housing of the centrifugal pump when in use.

2. The main liner according to claim 1, wherein each alignment portion is in the form of an arc on the outer surfaces of the main liner.

3. The main liner according to claim 1, wherein at least a portion of each alignment portion extends parallel to an axis of the discharge outlet.

4. A main liner for a centrifugal pump, the main liner being structured for receipt within an outer housing of the centrifugal pump when in use, the main liner comprising:

a main pumping chamber;

an inlet opening located on an inlet side of the main liner for introduction of a slurry into the main pumping chamber;

a drive side opening located on a drive side of the main liner opposite to the inlet side; and a discharge outlet extending from the main pumping chamber;

wherein an outer surface of the main pumping chamber includes a first protruding alignment portion located on the inlet side of the main liner in the form of an arc extending partially around the outer surface, and a second protruding alignment portion located on the drive side of the main liner to limit movement of the main liner relative to the outer housing of the centrifugal pump when in use.

5. The main liner according to claim 4, wherein at least a portion of each alignment portion extends parallel to an axis of the discharge outlet.

6. A centrifugal pump and a main liner for use in an assembly with the centrifugal pump, the assembly comprising:

the centrifugal pump having an outer housing defining an interior surface providing a pumping chamber for receipt of the main liner therein, the outer housing comprising a right side and a left side which register against each other in use, the pumping chamber having a first alignment portion formed as a recess in the interior surface, the recess being formed in the right side of the outer housing, and a second alignment portion formed as a recess in the interior surface, the recess of the second alignment portion being formed in the left side of the outer housing; and the main liner received, in use, within the pumping chamber of the centrifugal pump, the main liner having an inlet side with an inlet opening for introduction of a slurry into the pumping chamber and a drive side with an opening for receiving a drive mechanism therethrough, the main liner further having a discharge outlet extending from the main liner pumping chamber, the main liner having a first alignment portion protruding from an outer surface of the inlet side and a second alignment portion protruding from an outer surface on the drive side, the alignment portions being arranged for engaging with corresponding recesses formed in the interior surface of the outer housing of the centrifugal pump to limit movement of the main liner relative to the outer housing of the centrifugal pump.

* * * * *